United States Patent [19]
Brusa

[11] 3,789,126
[45] Jan. 29, 1974

[54] ELECTRIC FURNACE FOR HEATING AND MELTING SCRAP IRON AND STEEL

[76] Inventor: Ugo Brusa, Via Borgnis, Domodossola, Italy

[22] Filed: Dec. 20, 1972

[21] Appl. No.: 317,094

[30] Foreign Application Priority Data
Feb. 18, 1972 Italy .................................. 67521/72

[52] U.S. Cl. .......................................... 13/10, 13/33
[51] Int. Cl. ............................ F27d 3/12, F27d 13/00
[58] Field of Search ............................... 13/2, 33, 10

[56] References Cited
UNITED STATES PATENTS

| | | | |
|---|---|---|---|
| 1,299,336 | 4/1919 | Hechenbleikner | 13/2 |
| 3,173,980 | 3/1965 | Hysinger | 13/10 X |
| 904,991 | 11/1908 | Price | 13/2 X |

Primary Examiner—Roy N. Envall, Jr.

[57] ABSTRACT

An electric furnace for heating and melting iron and steel scrap is provided having an inclined, rotatable cylinder into which batched quantities of scrap are fed, at the upper end thereof, from a hopper that is vibrated. Teeth in the cylinder control the flow of the scrap therethrough. Scrap is delivered from the lower end of the cylinder into a basin in which electrode means are positioned. The slag and melted metal are removed by tilting the basin. Slidable locks control the flow of flue gases and means for cooling the cylinder are also provided.

5 Claims, 6 Drawing Figures

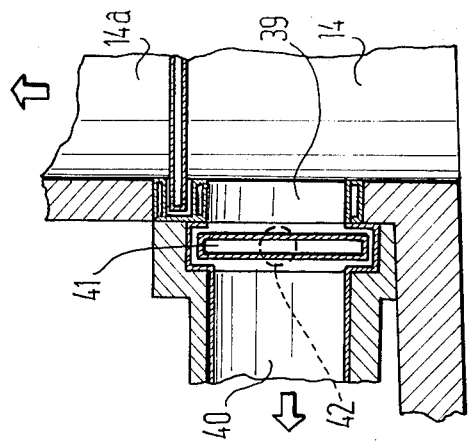
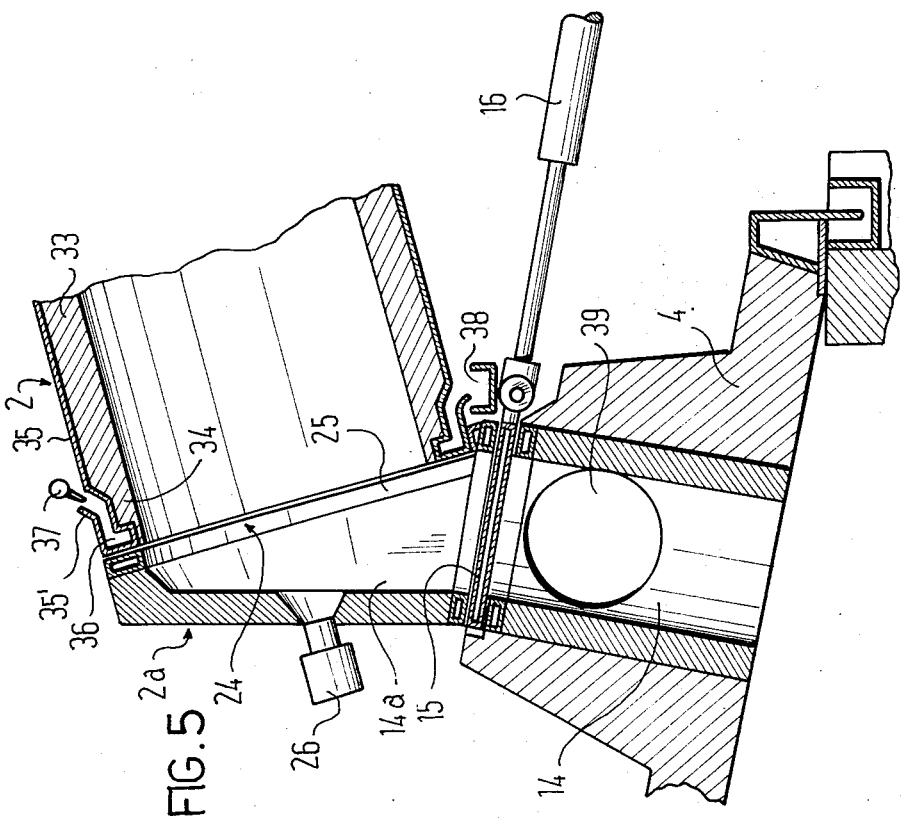

ELECTRIC FURNACE FOR HEATING AND MELTING SCRAP IRON AND STEEL

The present invention concerns an electric furnace for heating and melting scrap iron and steel.

According to the prior art processes the melting of steel in electric arc furnaces is carried out by introducing into the furnaces the scrap having ambient temperature and then by heating said scrap to the melting point by means of an electric arc which is struck and maintained between appropriate electrodes made of carbonaceous material or between the electrodes and the sole of the furnace.

However, this process has the disadvantage of being expensive due to the fact that the electric energy is used not only to melt the scrap but also to heat it, and that considerable thermic losses occur through the openings which connect the furnace to the atmosphere to allow the introduction of the scrap.

Another reason why the production cost of conventional melting processes is high consists in the wear of the electrodes.

In order to reduce the consumption of electric energy it has been suggested to carry out the preheating through non-electrical means, such as for instance oil or gas burners, but practically no appreciable results have been obtained hitherto since substantial economies could be achieved only by raising the preheating temperature to several hundreds degrees centigrade, and at such temperatures difficult problems would have to be faced in relation to the handling of the scrap and the oxidation of the metal, and furthermore thermic losses would occur during the introduction of the scrap into the furnace.

The object of this invention is to provide an electric furnace in which the electric energy is employed only for the melting operation and in which the scrap iron or steel is introduced in batched quantities and is preheated by means of the hot flue gases generated by the furnace itself and by burners, if any.

The furnace according to the invention comprises substantially a basin having a crown through which pass the electrodes and in which a channel is formed which serves to introduce the preheated scrap, said channel being in communication with the lower part of a cylinder which has its axis inclined with respect to the horizontal plane and is rotatable about its own axis; said cylinder is provided, at least at its lower part, with one or more burners which serve to preheat the scrap, and with a cooling system, and carries at its upper part a hood with chimney serving to collect and evacuate the flue gases. A hopper communicating with the upper part of said cylinder allows the introduction of batched quantities of scrap into the cylinder.

According to an advantageous feature of the invention the basin has, on two opposite side walls, openings serving for the evacuation of the slag and for the casting of the melted metal, and is hinged at its lower part on a horizontal axis parallel to said walls, about which axis it may be oscillated in either direction by any suitable means, for instance a hydraulic or pneumatic jack.

According to another feature of the invention the upper part of said cylinder has a set of inwardly projecting ribs formed therein which are capable of adjusting the drop speed of the scrap, and the cylinder is closed at its lower part by a lock formed integrally with the crown of the basin and having an offset opening therein which serves for the evacuation of the heated scrap.

Said opening communicates with the channel formed in the crown of the basin and is positioned excentrically also with respect to the axis of said channel.

Conveniently, said channel is closed at its upper part by means of a slidable lock and communicates with a further chimney formed in the crown of the basin and serving for the evacuation of the flue gases and from which it may be separated by means of another slidable lock.

According to a further feature of the invention the hopper is mounted on resilient supports and is provided with a vibrating device which allows adjustment of the amount of scrap entering the cylinder.

A preferred embodiment of the invention, given by way of non limitative example only, will be described hereafter with reference to the accompanying drawings wherein:

FIGS. 5 and 6 are sectional views illustrating some details.

Figure 1:
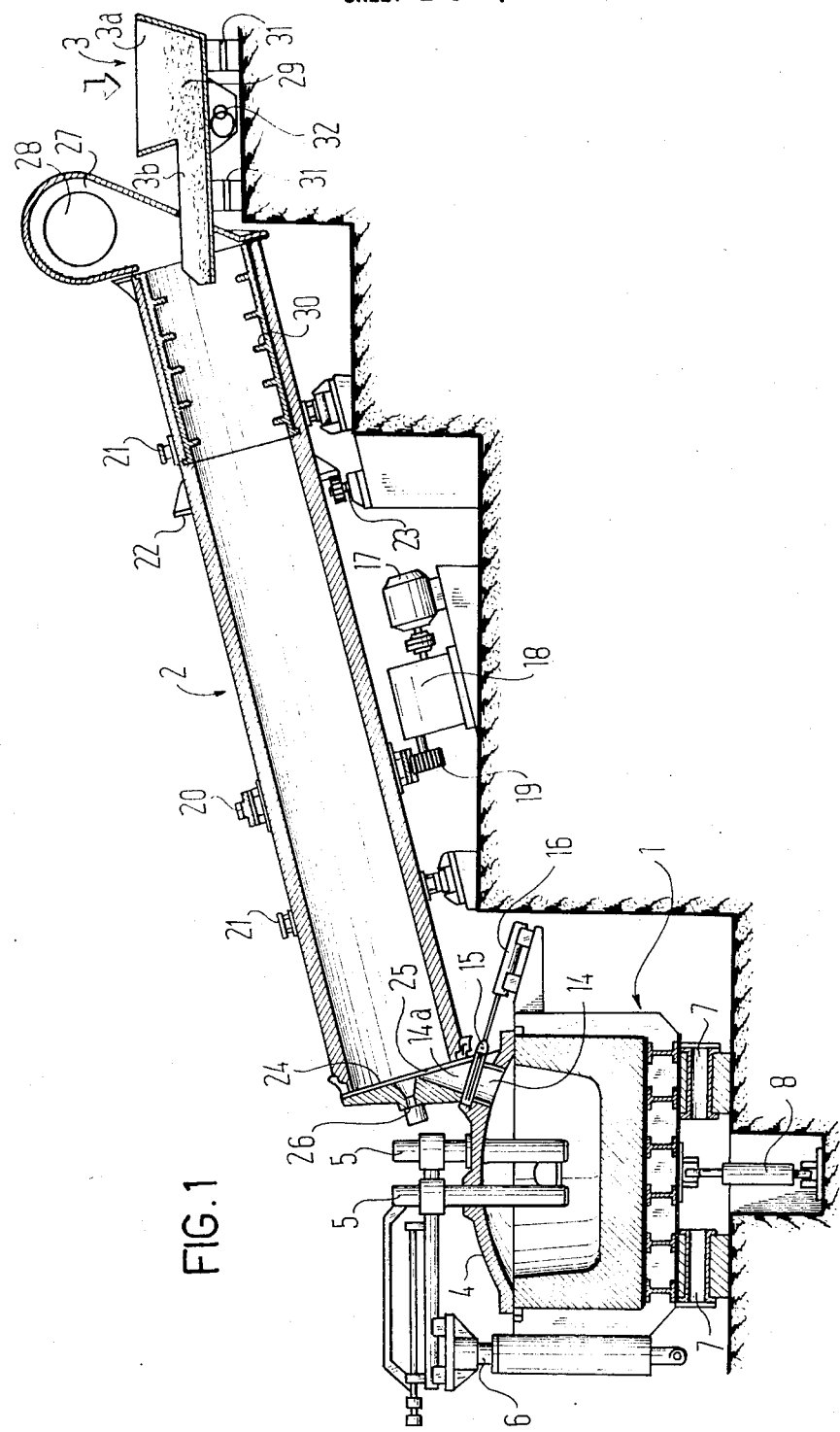
FIG. 1 is a part sectional side elevation of the furnace according to the invention.
Figure 2:
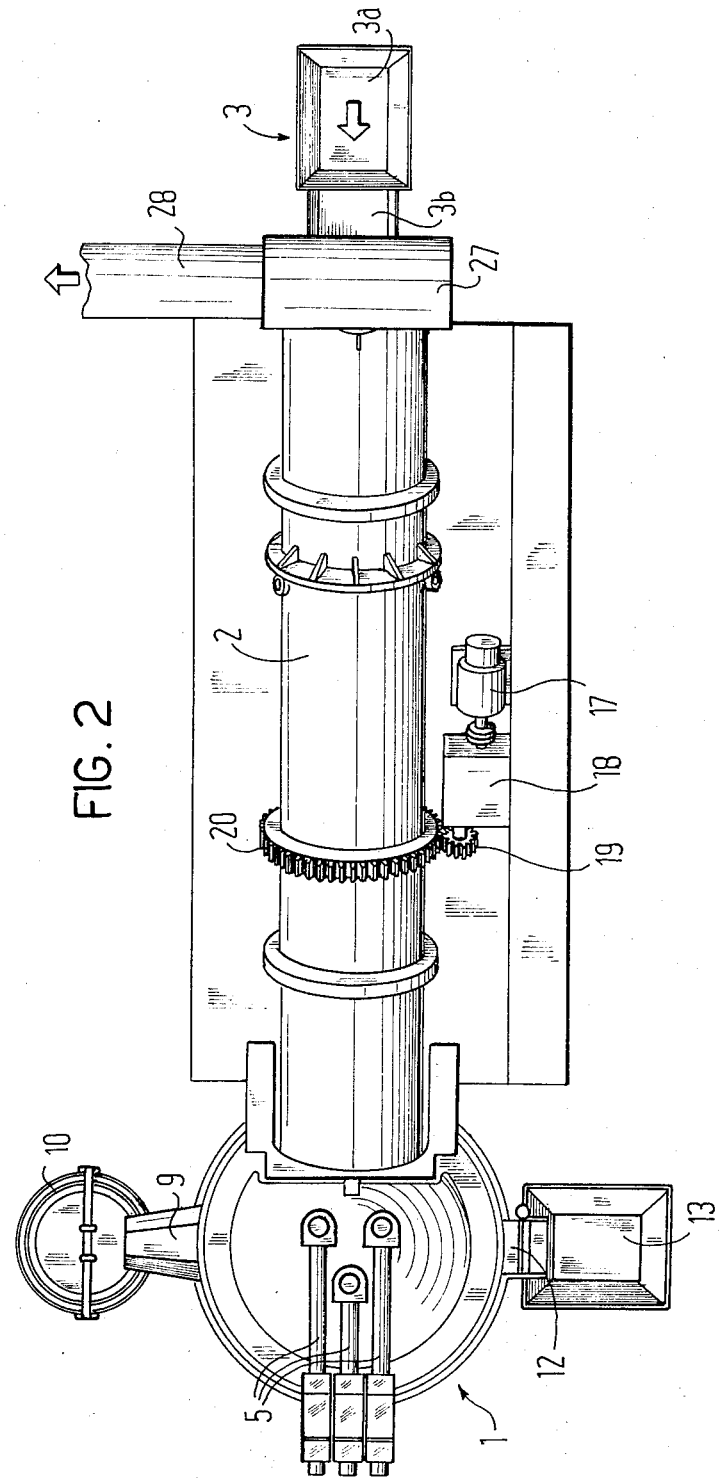
FIG. 2 is a plan view.
Figure 3:
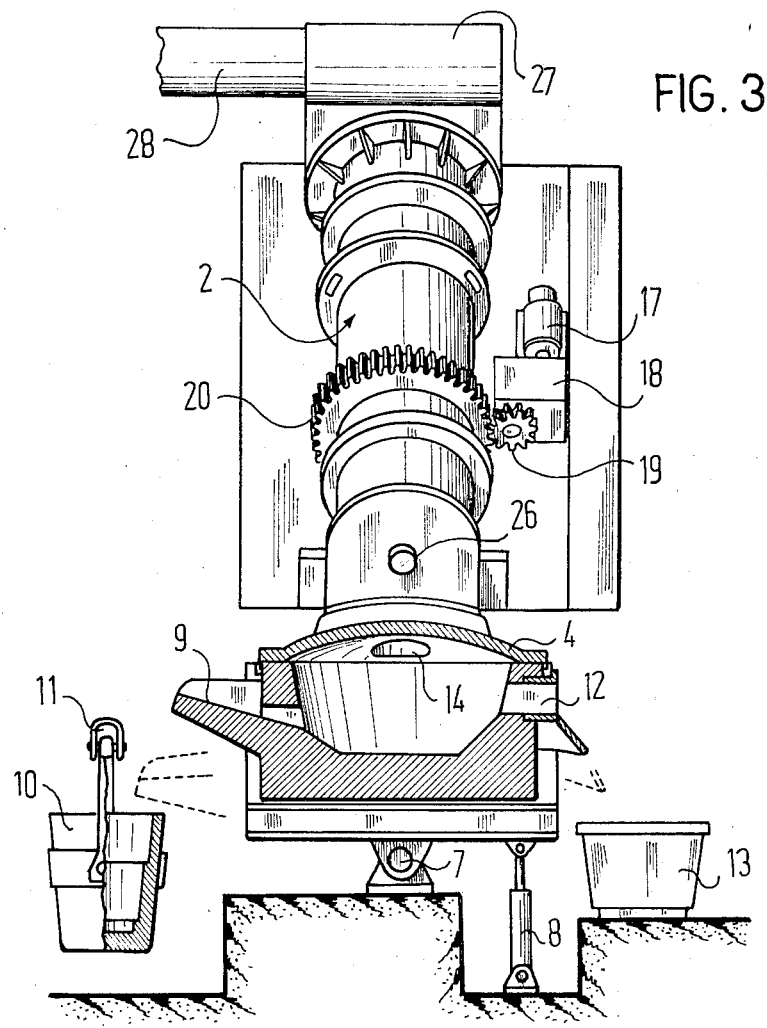
FIG. 3 is a part sectional front view.

Referring now to FIGS. 1 to 3, the device according to the invention includes substantially the melting basin 1, the heater 2 and the hopper 3 which serves for the introduction of batched quantities of scrap 29.

The basin, which is coated with a refractory material, is formed with a crown 4 through which extend the electrodes 5 connected to devices 6 of well known type which allow to lift and lower the electrodes, and is hinged adjacent its lower part about a horizontal axis 7. A jack 8 allows oscillation of the basin 1 about the axis 7 in either direction when the evacuation of the slag and/or the casting of the melted metal have to be performed. To this end, one of the walls of the basin which are parallel to the axis 7 is provided with the outlet spout 9 for the melted metal, whereas the opposite wall is provided with a channel 12 for the evacuation of the slag. A ladle 10, formed with a lifting ring 11, allows to collect the melted metal, while a carriage 13 provides for the collection of the slag.

Formed in the crown 4 of the basin there is a substantially vertical channel 14 serving for the introduction of the heated metal, which channel is connected to another channel 14a formed in the end part 2a of the heater 2. Positioned between the channel 14 and the channel 14a there is a slidable lock 15 actuated by a hydraulic or pneumatic jack 16. This lock may close hermetically the passage between the two channels or it may be in an open position thereby allowing the passage of the flue gases from the basin 1 into the heater 2, which flue gases may thus cooperate in heating the scrap.

The heater comprises a cylinder made of a refractory material, the axis of said cylinder being inclined relative to the horizontal plane. Said cylinder is mounted on suitable supports 21 so as to be rotatable about its axis and is provided with a thrust device formed by the gears 22, 23, which prevents thhe cylinder from sliding downwards while allowing its rotation. Advantageously the rotation of the cylinder may be obtained by means of a motor 17 which, through a reduction gear 18, drives a pinion 19 meshing with a gear 20 coaxial with the cylinder and formed integrally with the outer surface of the cylinder. In order to facilitate maintainance, the unit consisting of motor 17, reduction gear 18 and pinion 19 is spaced laterally relative to cylinder 2.

Figure 4:
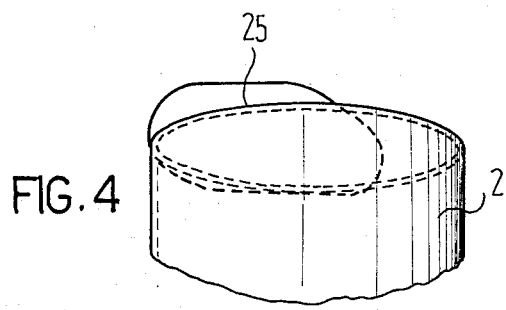
FIG. 4 is a diagrammatical representation illustrating the connection between the furnace and the heating means.

The end part 2a of the preheater is integral with the crown 4 of the basin 1 and is separated from the remaining part of the cylinder 2 by means of a lock 24, the lower part of which is provided with an opening 25 for the output of the heated scrap, the center of which is spaced from the axis of the cylinder 2 (FIG. 4). At least in this lower part of the device 2 is mounted a burner 26. Further burners may, if it is desired, be mounted on the side walls of cylinder 2.

The upper part of cylinder 2 is closed by a hood 27 with a chimney 28 which serves to collect and evacuate the flue gases and is provided with an opening for the introduction of the scrap 29.

In order to prevent a too rapid drop of the scrap 29 towards the bottom of channel 2, a set of ribs 30 is realized in the upper part of this channel, on the inner surface thereof.

The invention includes also means for the introduction of batched quantities of scrap 29. Advantageously these means comprise a hopper 3 which has its bottom slightly inclined forwardly and is formed of a part 3a shaped substantially as an overturned frustum of pyramid open upwards, into which the scrap is introduced by any suitable means, and of a spout 3b extending from the lower part of the frustum of pyramid 3a into the heater 2. The hopper 3 is mounted at its lower part on resilient supports 31 about which it maybe oscillated by means of a device 32.

Referring now to FIGS. 5 and 6, there is illustrated in more details the connection between the preheating device 2 and the melting furnace 1.

As it can be seen, the refractory wall 33 of the cylinder 2 has an end portion 34 of reduced thickness and is provided with a metal coating 35 which, in correspondence of the portion of reduced thickness 34, is provided with a limb 35' which is bent rearwardly in such a way as to form a channel 36 in which circulates cooling water which is introduced through a pipe 37 and is evacuated through a further channel 38.

The cooling of this portion is necessary because of the presence of the burner 26.

From FIG. 5 it can also be seen that in the upper part of channel 14 there is an opening 39 connecting said channel 14, and consequently the melting basin 1, to the channel 40 which constitutes a further chimney for the evacuation of the flue gases generated by the fusion. A slidable lock 41 perpendicular to the axis of channel 40 and actuated by a hydraulic or pneumatic jack, the trace of which is indicated by a dashed line at 42, allows to cut off the communication between the channels 14 and 40.

The operation of the described device is as follows:

as the hopper is subjected to oscillation by the action of the device 32, the scrap having ambient temperature, and which is introduced in batched quantities into the hopper 3 by any suitable means, enters the rotatable preheater 2 and slides towards the lower part thereof along the chamber, provided with teeth 30, formed in the upper part of cylinder 2. In the upper part of cylinder 2 the scrap is heated by the flue gases generated by the burner 26, whereas in the lower part of said cylinder the heating is effected by the direct action of said burner. Rotation of channel 2 ensures uniform heating of the whole mass of scrap.

In consequence of the rotation of cylinder 2 the scrap, preheated up to the desired point, is discharged through the excentric opening 25 and enters the channel 14a and then, as the lock 15 is opened, the basin 1 where it is molten electrically. After the melting operation has been accomplished, the slag is evacuated towards the carriage 13 and the melted metal is poured into the ladle 10 which is then conveyed to subsequent treatment stations.

Whenever the lock 15 is opened again, the subsequent batches of scrap drop into the basin 1 and are surrounded by the melted metal contained therein, which cooperates in further increasing the temperature of the scrap.

The flue gases generated by the preheating are exhausted through the chimney 28, whereas the flue gases which are generated by the fusion may be evacuated through chimney 40 or, if desired and if the lock 15 does allow it, they may be conveyed towards the cylinder 2 to cooperate in heating the scrap.

What is claimed is:

1. An electric furnace for heating and melting iron and steel scrap, comprising a basin made at least in part of refractory material, a crown covering said basin, electrode means extending through said crown, a channel formed in said crown for introducing heated scrap into said basin, a cylinder made of a refractory material and inclined relative to the horizontal plane, the lower end of said cylinder being formed integrally with said crown and being provided with an eccentric opening through which the scrap is discharged, a contiguous channel communicating with the channel formed in said crown of the basin, means for rotating said cylinder about its axis, means in said cylinder for preheating the scrap, a slidable lock separating the two channels, a jack for actuating said lock, a hood having a chimney for collecting and evacuating the flue gases, and a hopper for introducing batched quantities of scrap into said cylinder.

2. A furnace as claimed in claim 1, wherein said cylinder is provided internally, proximate its upper end, with a set of teeth for reducing the drop speed of the scrap.

3. A furnace as claimed in claim 1, wherein the outer wall surface of said cylinder is provided with a metal coating and has, proximit its lower end, a portion of reduced thickness at which the metal coating is provided with a rearwardly bent limb forming a channel in which cooling water circulates.

4. A furnace as claimed in claim 1, wherein said channel formed in the crown of said basin is provided, adjacent to said slidable lock, with an opening which leads to a chimney serving for evacuating the flue gases, there being further provided in said chimney a slidable lock for cutting off the communication with said channel formed in the crown of said basin.

5. A furnace as claimed in claim 1, wherein the bottom of said hopper is inclined towards said cylinder and is supported on resilient means, means being provided for oscillating said hopper whereby the scrap is introduced into said cylinder.

* * * * *